(12) United States Patent
Yang

(10) Patent No.: US 6,354,816 B1
(45) Date of Patent: Mar. 12, 2002

(54) APPARATUS FOR AUTOMATICALLY FEEDING LUBRICATING OIL

(75) Inventor: Yun Jong Yang, Seoul (KR)

(73) Assignee: Korea Leading Technology Co., Ltd., Paju (KR)

( * ) Notice: Subject to any disclaimer, the term of this patent is extended or adjusted under 35 U.S.C. 154(b) by 0 days.

(21) Appl. No.: 09/518,764

(22) Filed: Mar. 3, 2000

(30) Foreign Application Priority Data

Dec. 2, 1999 (KR) ......................................... 1999-54507

(51) Int. Cl.⁷ ............................. F04B 17/00; F04B 35/04
(52) U.S. Cl. ......................................... 417/411; 184/37
(58) Field of Search ........................... 184/81, 6.1, 6.4, 184/37, 39, 7.4; 123/65 B; 229/7 R; 417/411

(56) References Cited

U.S. PATENT DOCUMENTS

| | | | | |
|---|---|---|---|---|
| 4,034,831 A | * | 7/1977 | Gruett | 184/81 |
| 4,095,674 A | * | 6/1978 | Kido et al. | 184/6.1 |
| 4,284,174 A | * | 8/1981 | Salvana et al. | 184/6.4 |
| 4,512,292 A | * | 4/1985 | Hundermark | 123/65 B |
| 4,572,422 A | * | 2/1986 | Heuberger et al. | 229/7 R |
| 5,050,707 A | * | 9/1991 | Wilhelmsen | 184/87 |
| 5,402,913 A | | 4/1995 | Graf | |
| 5,404,966 A | | 4/1995 | Yang | |
| 5,409,084 A | * | 4/1995 | Graf | 184/39 |
| 5,460,243 A | | 10/1995 | Patterson | |
| 5,622,239 A | | 4/1997 | Orlitzky | |
| 5,634,531 A | * | 6/1997 | Grag et al. | 184/37 |
| 6,012,551 A | * | 1/2000 | Raab | 184/7.4 |

\* cited by examiner

Primary Examiner—Teresa Walberg
Assistant Examiner—Leonid Fastovsky
(74) Attorney, Agent, or Firm—Beyer Weaver & Thomas, LLP

(57) ABSTRACT

An automatic lubricating oil feeding apparatus for automatically feeding lubricating oil at predetermined intervals to rotary driving parts of various kinds of machines where bearings are installed. The apparatus can easily conquer the resistance of tube passages of the machines and thus facilitate the lubricating oil feeding to the machines by forming a lubricating oil discharge structure having a mechanical type vertical suction pump structure. The apparatus can also remove the oil-separation phenomenon even if the apparatus is used for a long time by effecting a pumping operation for suction and discharge of the lubricating oil by the pressure of a flanger ascending and descending by a mechanical driving force, and thus not applying a high pressure to a lubricating oil pouch. The apparatus includes a top cover wherein the lubricating oil pouch is installed, and a main case fastened to the top cover and receiving therein a nipple secured to a shaft of a bearing and a pump for controlling extrusion of a fixed amount of the lubricating oil. The pump is placed between an exit of the lubricating oil pouch and the nipple, and suction and discharge of the lubricating oil is performed by ascending and descending operation of a flanger of the pump which is driven by a motor.

22 Claims, 10 Drawing Sheets

APPARATUS FOR AUTOMATICALLY FEEDING LUBRICATING OIL

BACKGROUND OF THE INVENTION

1. Field of the Invention

The present invention relates to an automatic lubricating oil feeding apparatus which automatically feeds lubricating oil at predetermined intervals to parts requiring the lubricating oil such as rotary driving parts of various kinds of machines where bearings are installed. In particular, the present invention relates to an automatic lubricating oil feeding apparatus which can easily conquer the resistance of tube passages of machine elements where bearings are installed and thus facilitate the lubricating oil feeding to the machine elements by forming a lubricating oil discharge structure having a mechanical type vertical suction pump structure.

2. Description of the Prior Art

Generally, a lubricating oil feeding apparatus feeds lubricating oil to rotary driving parts of a machine having a structure which continuously operates with friction such as bearings to prevent wear of the driving parts due to friction and to effect a smooth running of the machine.

Conventional lubricating oil feeding apparatuses for feeding lubricating oil to rotary elements have been developed and used.

One among the conventional apparatuses is a grease gun for manually feeding the lubricating oil at specified times. In this apparatus, managements of feeding times, parts to be fed with the lubricating oil, security of feeding manpower, etc., should be thoroughly performed. If such managements are not accurately performed, this causes an early wear or damage of the bearings, and thus the whole machine may be shocked.

In order to solve the above problems, there have been proposed automatic lubricating oil feeding apparatuses whereby the lubricating oil, which is filled in a housing connected to a bearing, is continually and intermittently fed to the bearings for a determined period. These apparatuses solve the problems involved in the manual type lubricating oil feeding apparatuses as described above, but still have other problems to be solved.

An initially developed automatic lubricating oil feeding apparatus uses the elasticity of a spring. According to this apparatus, the spring continuously presses the lubricating oil downward, and if the apparatus is used for a long time, an oil-separation phenomenon occurs in the grease which is the lubricating oil.

This oil-separation phenomenon causes the oil to slip out of a lubricating oil pouch as a specified period of time elapses, and only other components of the grease remain in the pouch. Accordingly, the grease is hardened as much as that the grease cannot be pushed out any more by the elasticity of the spring, and this causes the performance of the lubricating oil feeding apparatus to be degraded and the feeding of the grease to be impossible, thereby inviting the damage of the bearing.

Meanwhile, in case that a suction pressure is produced due to a high-speed rotation of the bearing, the grease is sucked into the bearing in one lot, and a severe heat generation due to an overfeeding of the lubricating oil invites a rapid deterioration of the grease, resulting in the wear and damage of the bearing.

If the spring having a small elasticity is used to overcome the above problems, the discharge pressure for feeding the grease is lowered, and this causes the grease not to be fed even by a small resistance of the tube passage.

Also, gas generation type and electrochemical type automatic lubricating oil feeding apparatuses have been proposed. The gas generation type apparatus uses the chemical reaction, and the electrochemical type apparatus uses a battery.

According to the above-described lubricating oil feeding apparatuses, the grease suction phenomenon in one lot can be avoided. However, since the gas pressure continuously acts on the grease, the oil-separation phenomenon also occurs as in the spring type lubricating oil feeding apparatus.

Also, since these apparatuses do not have the structure where the battery is easily separable, the consumed pouch is abrogated together with the battery to cause the environmental pollution. In addition, these apparatuses have the disadvantages that they do not provide diverse display of the operating state to cause inconvenience in use, and have a very low discharge pressure of grease.

SUMMARY OF THE INVENTION

It is an object of the present invention to solve the problems involved in the prior art, and to provide an automatic lubricating oil feeding apparatus which can remove the oil-separation phenomenon even if the apparatus is used for a long time by effecting a pumping operation for the suction and discharge of lubricating oil by the pressure of a flanger ascending and descending by a mechanical driving force, and thus by not applying a high pressure to a lubricating oil pouch.

It is another object of the present invention to provide an automatic lubricating oil feeding apparatus which can feed an accurate amount of lubricating oil by extruding a fixed quantity of lubricating oil by the stroke of a flanger.

It is still another object of the present invention to provide an automatic lubricating oil feeding apparatus which can easily conquer the resistance of tube passages of machine elements by a high discharge pressure by a flanger and thus facilitate the lubricating oil feeding to the machine elements.

It is still another object of the present invention to provide an automatic lubricating oil feeding apparatus which can facilitate the lubricating oil replacement work by exchanging only an lubricating oil pouch after the whole lubricating oil is consumed.

In order to achieve the above objects, there is provided an automatic lubricating oil feeding apparatus which comprises a top cover wherein a lubricating oil pouch is installed, and a main case screw-fastened to the top cover, and receiving therein a nipple secured to a shaft of a bearing, an information display window formed thereon, and a pump for controlling extrusion of a fixed amount of lubricating oil installed.

The interior of the main case is formed so that the pump is placed between an exit of the lubricating oil pouch and the nipple, and the lubricating oil is sucked and extruded by ascent and descent of the flanger of the pump. In the main case is installed a motor for driving the pump.

BRIEF DESCRIPTION OF THE DRAWINGS

The above objects, other features and advantages of the present invention will become more apparent by describing the preferred embodiment thereof with reference to the accompanying drawings, in which.

DETAILED DESCRIPTION OF THE PREFERRED EMBODIMENT

Figure 1:
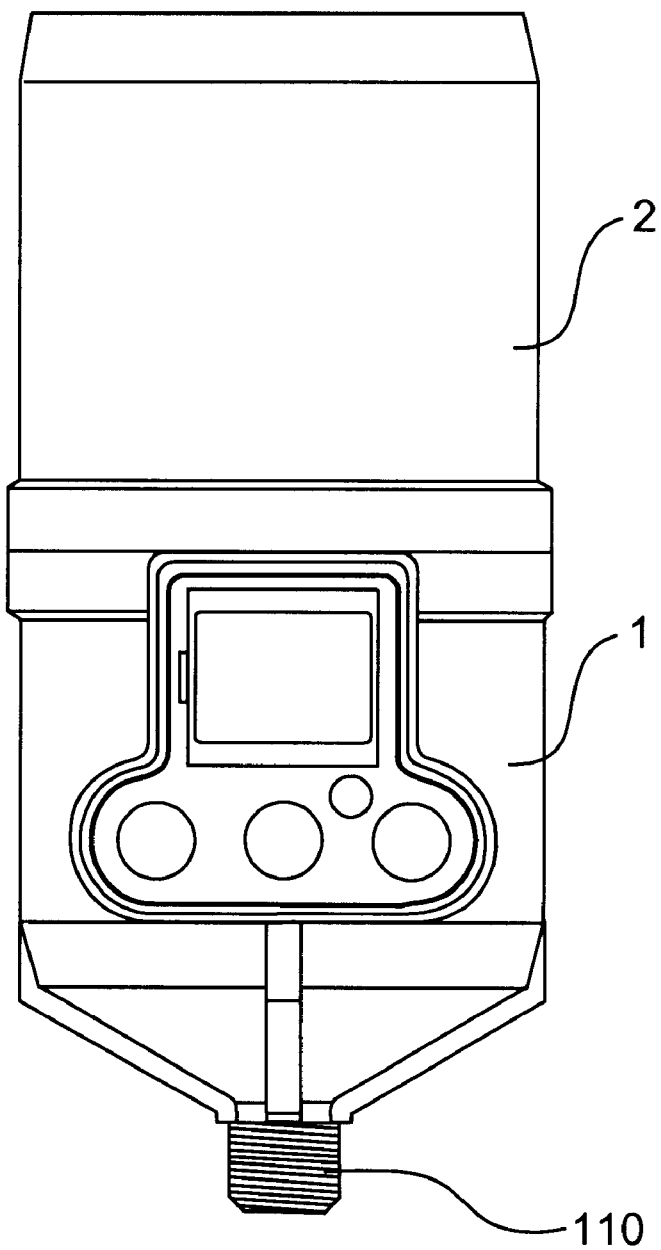
FIG. 1 is a front view illustrating the structure of the lubricating oil feeding apparatus according to the present invention.
Figure 2:
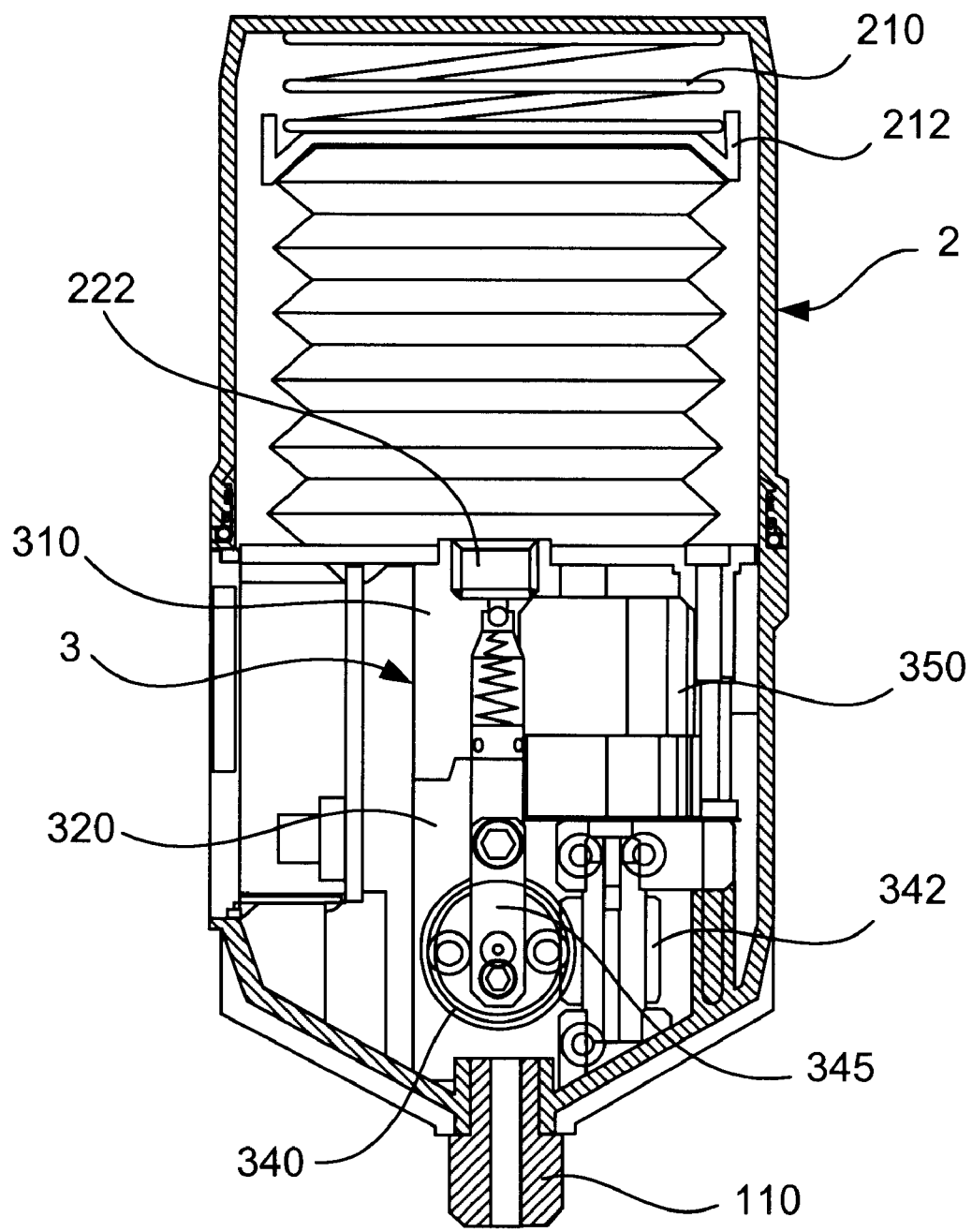
FIG. 2 is a sectional view of FIG. 1.
Figure 3:
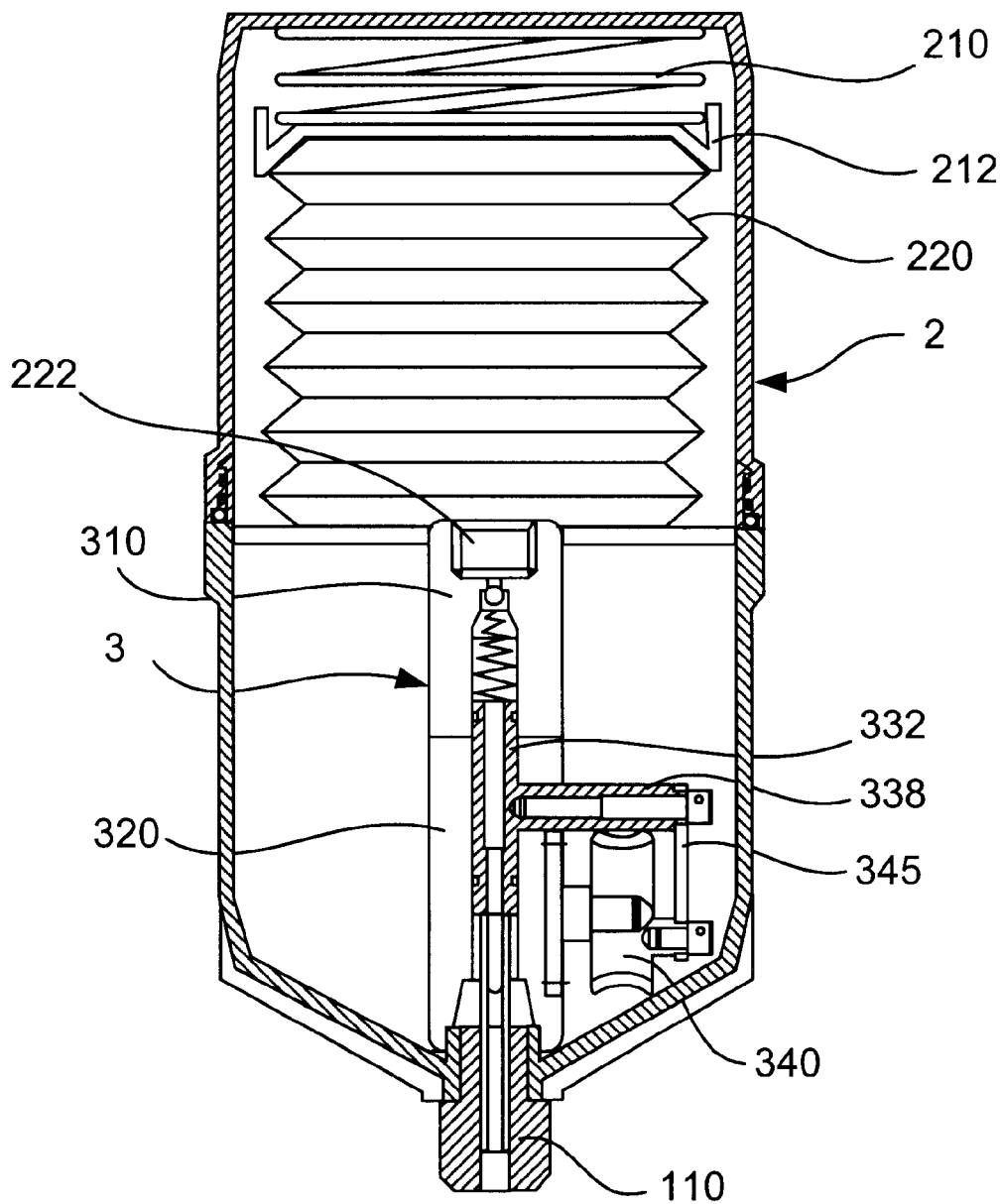
FIG. 3 is a sectional view taken along the direction rotated by 90 degrees from FIG. 2.
Figure 4:
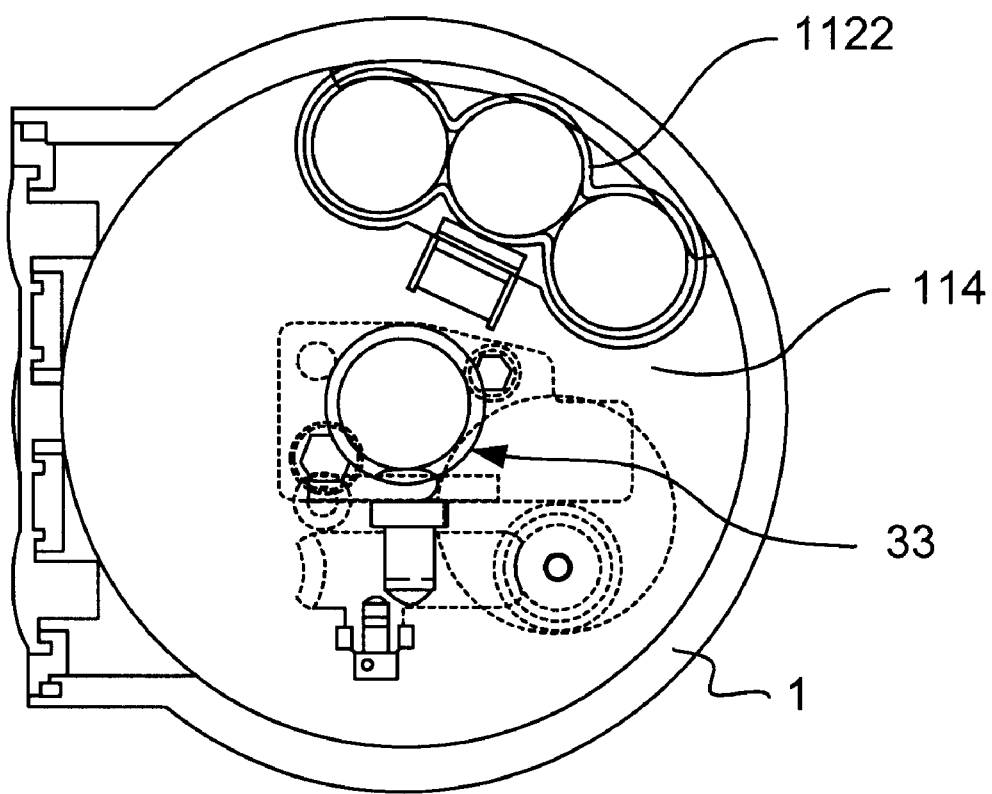
FIG. 4 is a plan view illustrating the construction of the lubricating oil feeding apparatus according to the present invention.
Figure 5:
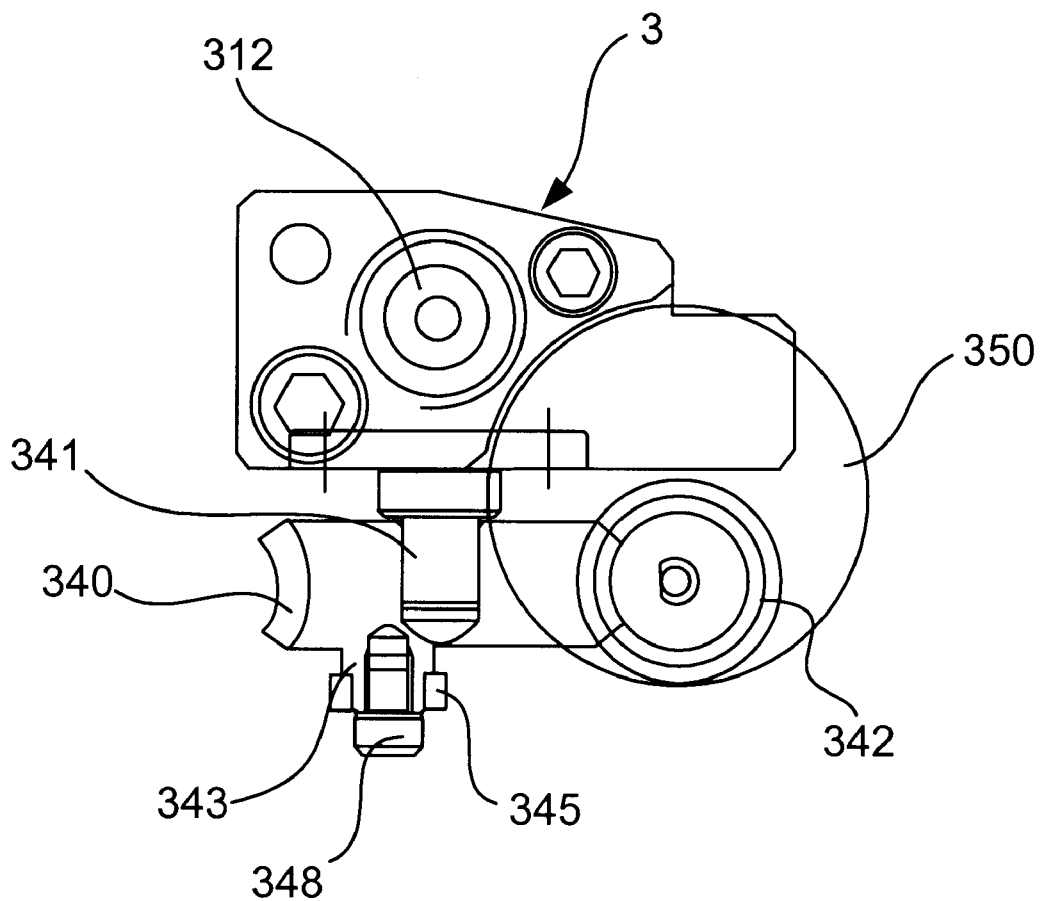
FIG. 5 is a plan view of a lubricating oil pump in the lubricating oil feeding apparatus according to the present invention.
Figure 6:
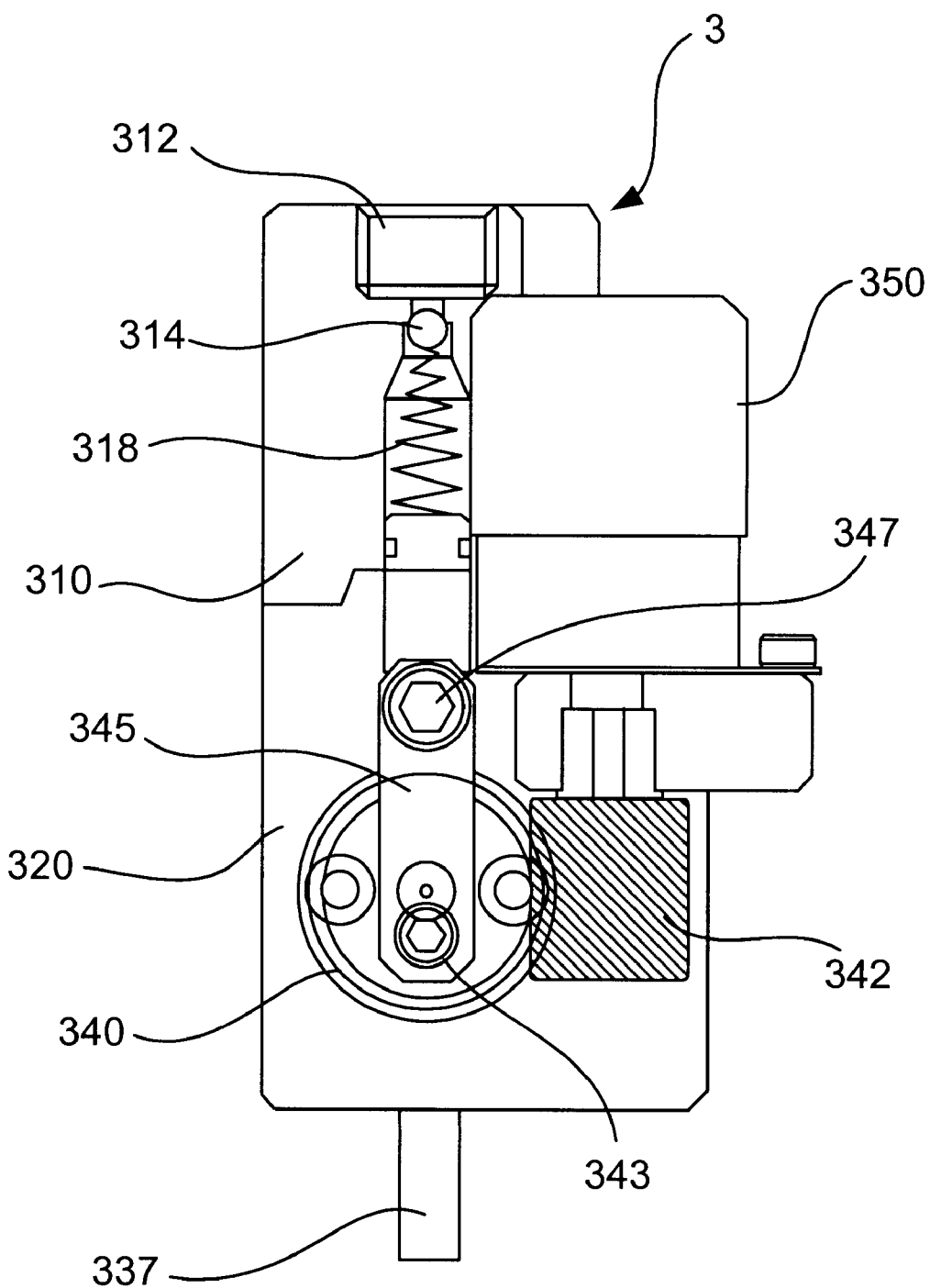
FIG. 6 is a front view of FIG. 5.
Figure 7:
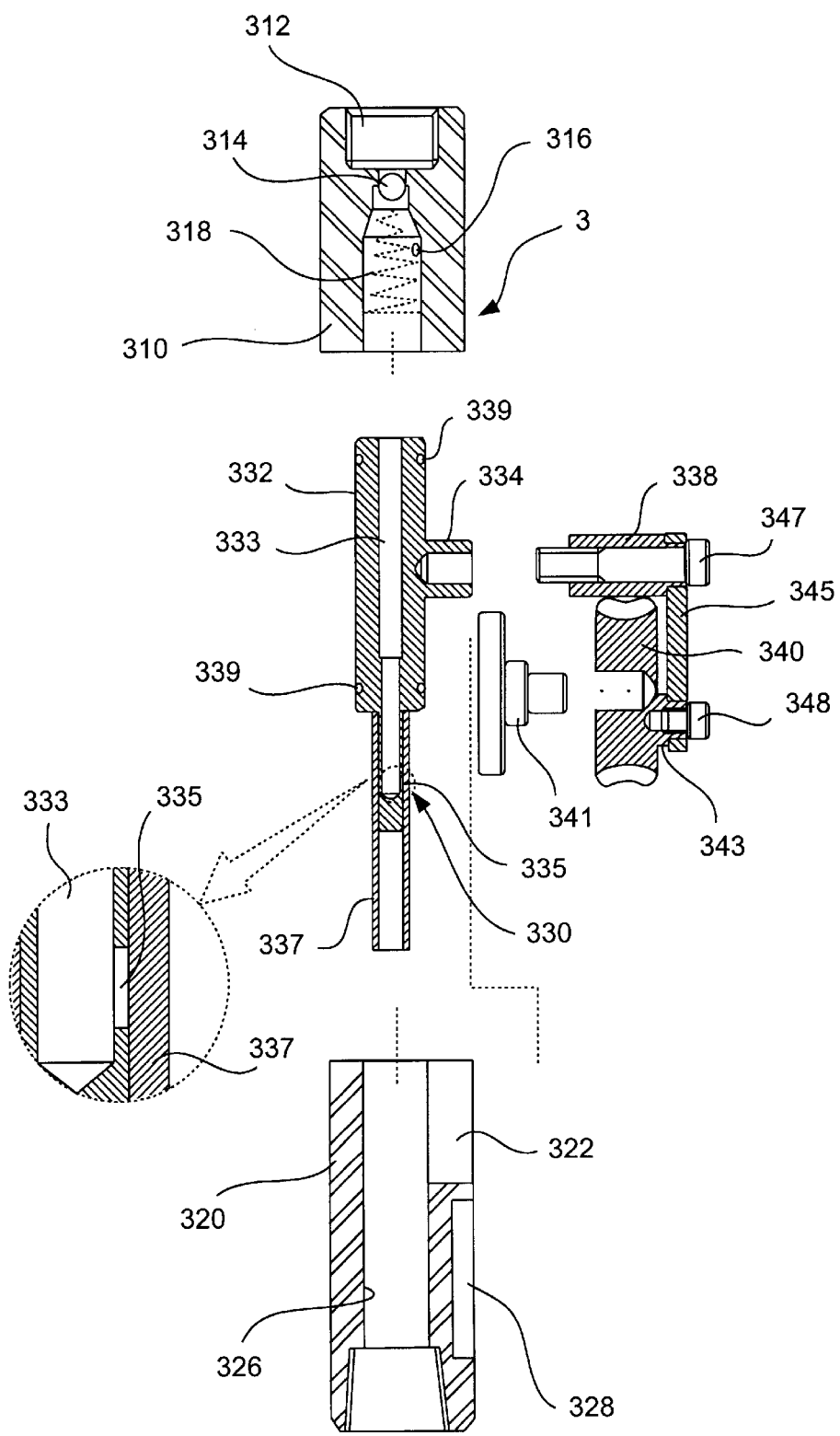
FIG. 7 is a exploded sectional view of FIG. 6.
Figure 8:
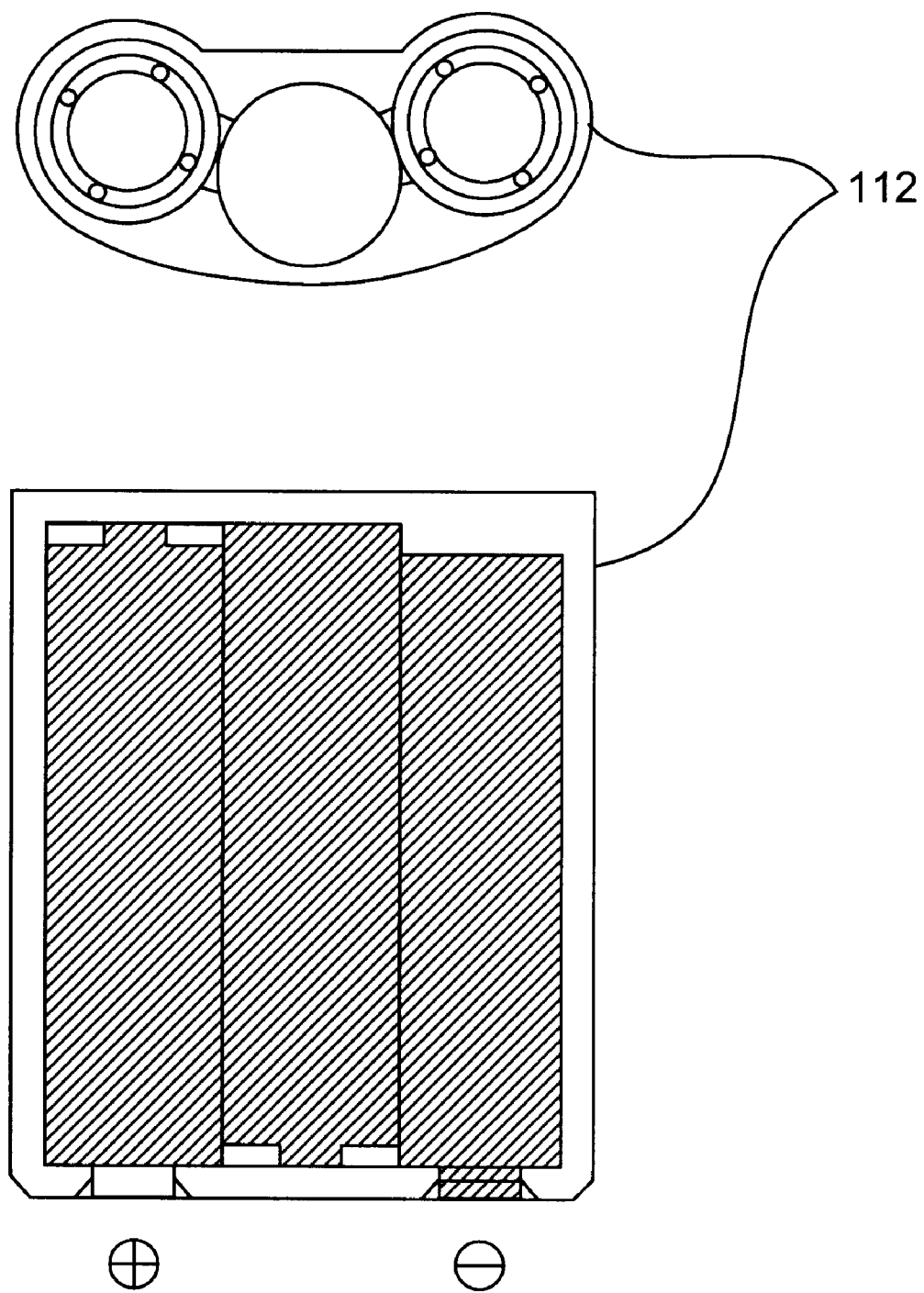
FIG. 8 is a view illustrating a battery case.
Figure 9:
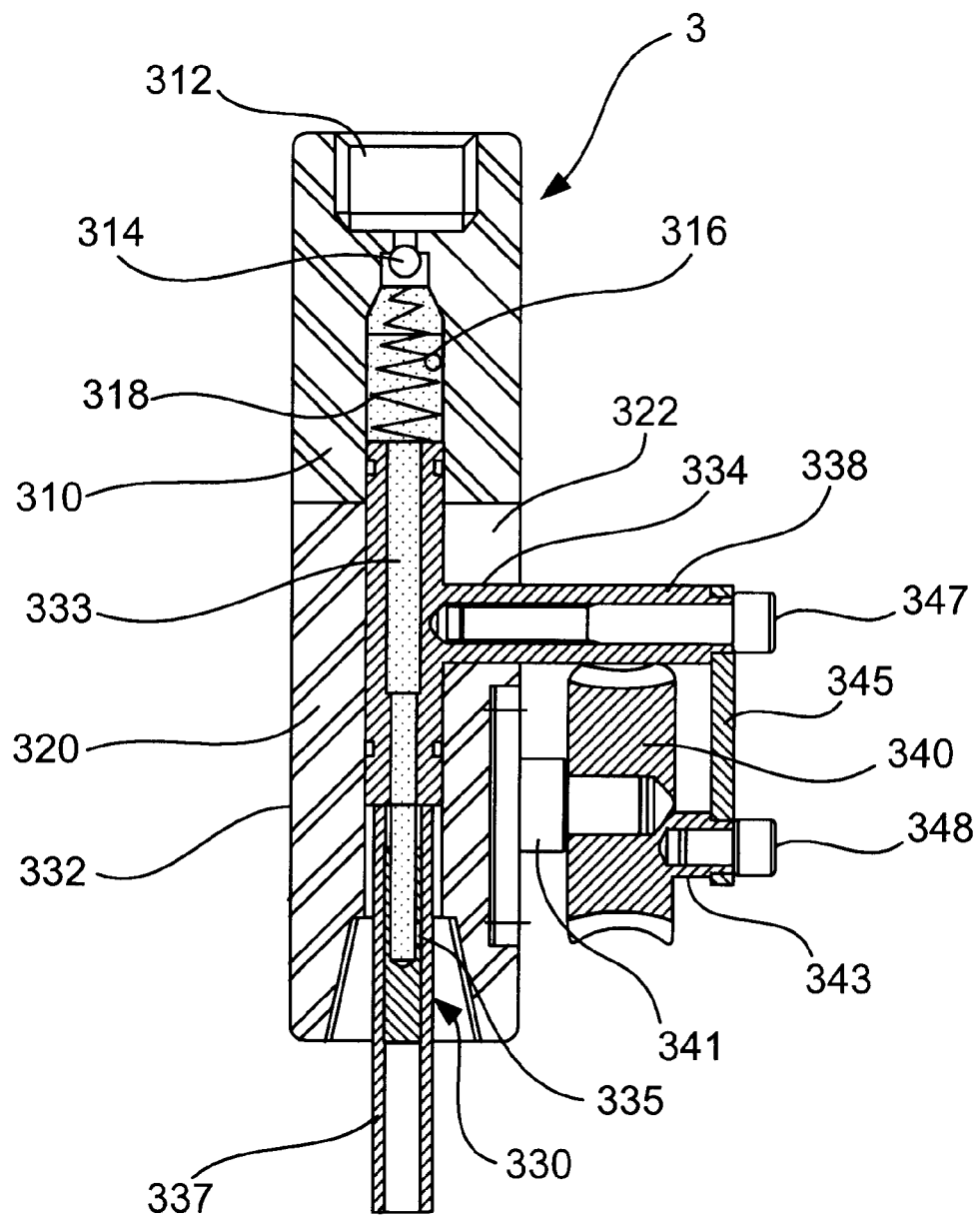
FIG. 9 is a sectional view of a lubricating oil pump according to the present invention explaining the state of the lubricating oil suction.

Referring to FIGS. 1 to 10, the automatic lubricating oil feeding apparatus according to the present invention comprises a main case 1 positioned on a lower portion of the apparatus, a top cover 2 screw-fastened to an upper portion of the main case, and a pump 3.

The main case 1 includes a nipple 110 fastened to the main case along a central axis of the main case 1, a plurality of manipulation switches and a large-scaled liquid crystal display (LCD) formed on one side of the main case 1. Also, a fastening screw is formed on an outer periphery of the upper portion of the main case, and a partition 114, which has a through hole formed thereon for supporting a battery case 112 and an upper portion of the pump 3, is secured to the upper portion of the main case 1 to close an upper opening of the main case 1. The main case also has an inner space where a motor and a battery required for discharging lubricating oil, and the pump actually performing the lubricating oil discharge is installed.

The top cover 2 is cylindrical, and has a screw formed on an inner periphery of a lower portion thereof, a pressure spring 210 and a pressure plate 212 formed on an upper portion of its inside, and a lubricating oil pouch 220 built therein to receive an elastic force from the pressure spring and the pressure plate.

It is preferable that the lubricating oil pouch has the shape of wrinkles to facilitate its contraction under the pressure of the pressure spring and the pressure plate. The pressure spring assists the outflow of the lubricating oil by contracting the lubricating oil pouch so that the lubricating oil is extruded from the lubricating oil pouch by the suction force provided from the pump while the lubricating oil pouch maintains its horizontality without being inclined.

The pump 3 comprises an upper body 310, a lower body 320, and a plunger assay 330 inserted between the upper body and the lower body.

The upper body 310 has a tap hole 312 formed on an upper end of the upper body for being screw-engaged with a gateway 222 of the lubricating oil pouch 220, and a passage 316 formed extending from the tap hole for receiving therein a ball valve 314 acting as a check valve.

The lower body 320 has a passage 326 formed thereon to be concentric with the passage 316 of the upper body, an open type elongated hole 322 having the form of a slit and formed on one side of the lower body 320, and a seat 328 inserted below the elongated hole 322 for screw-engaging with a shaft 341 for fastening a worm wheel 340.

The plunger assay 330 has a cylindrical shape, and ascends and descends in the passages 316 and 326 of the upper body 310 and the lower body 320.

A protrusion 334 is formed on one side of a plunger shaft 332, and a through hole 333 is formed through the plunger shaft 332 in a manner that the through hole does not penetrate through the plunger shaft and the lower portion of the plunger shaft is closed. An exhaust hole 335 is formed on the lower portion of the plunger shaft 332 so as to cross-penetrate to the through hole 333. On the upper and lower portions of the plunger shaft 332 is formed a sealing 339 for preventing the leakage of pressure.

Also, a flexible tube 337 is fitted on an outer periphery of the exhaust hole 335 of the plunger shaft 332 for acting as a check valve.

The upper body 310 and the lower body 320 communicates with each other through the passages 316 and 326, the plunger shaft 332 of the plunger assay 330 is inserted into the passages, and the protrusion 334 of the plunger shaft is protruded into the elongated hole 322.

At this time, a spring 318 is inserted between the ball valve 314 and the upper portion of the plunger shaft 332 to enable the ball valve to act as a check valve.

A motor 350 with a built-in speed reducer is fixed to the one side of the body, and a shaft 341 for fixing the worm wheel 340 is secured to the seat 328 of the lower body 320. A worm gear 342 fixed to a shaft of the speed reducer is engaged with the worm wheel 340.

At the same time, an eccentric driving shaft 343 is formed on one side of the worm wheel 340, and a link 345 for connecting the eccentric driving shaft 343 and the protrusion 334 of the plunger shaft is secured to the seat via a lever 338. The link is fastened by bolts 347 and 348.

The pump 3 as constructed above is secured between the nipple 110 and the through hole of the partition 114 in the main case 1. The battery case 112 detachably receives a small-capacity battery.

The operation of the automatic lubricating oil feeding apparatus according to the present invention will now be explained.

If a lubricating oil feeding time comes up, the motor 350 is driven by a control means (not illustrated), and the worm gear 342 is rotated by the driving force of the motor 350.

The worm gear 342 then rotates the worm wheel 340, and thus the link eccentrically connected to the worm wheel makes the plunger shaft 332 descend through the protrusion 334.

As the plunger shaft 332 descends (FIGS. 3 AND 9), a negative pressure is produced by the operation of the piston, and opens the ball valve 314, so that the lubricating oil is fed from the gateway 222 of the lubricating oil pouch 220 connected to the ball valve 314.

The position where the lubricating oil is sucked at maximum is where the eccentric driving shaft 343 of the worm wheel 340 reaches its lowest point. The suction amount of the lubricating oil is determined by the volume provided by the passage 316 and the descending stroke of the plunger.

Figure 10:
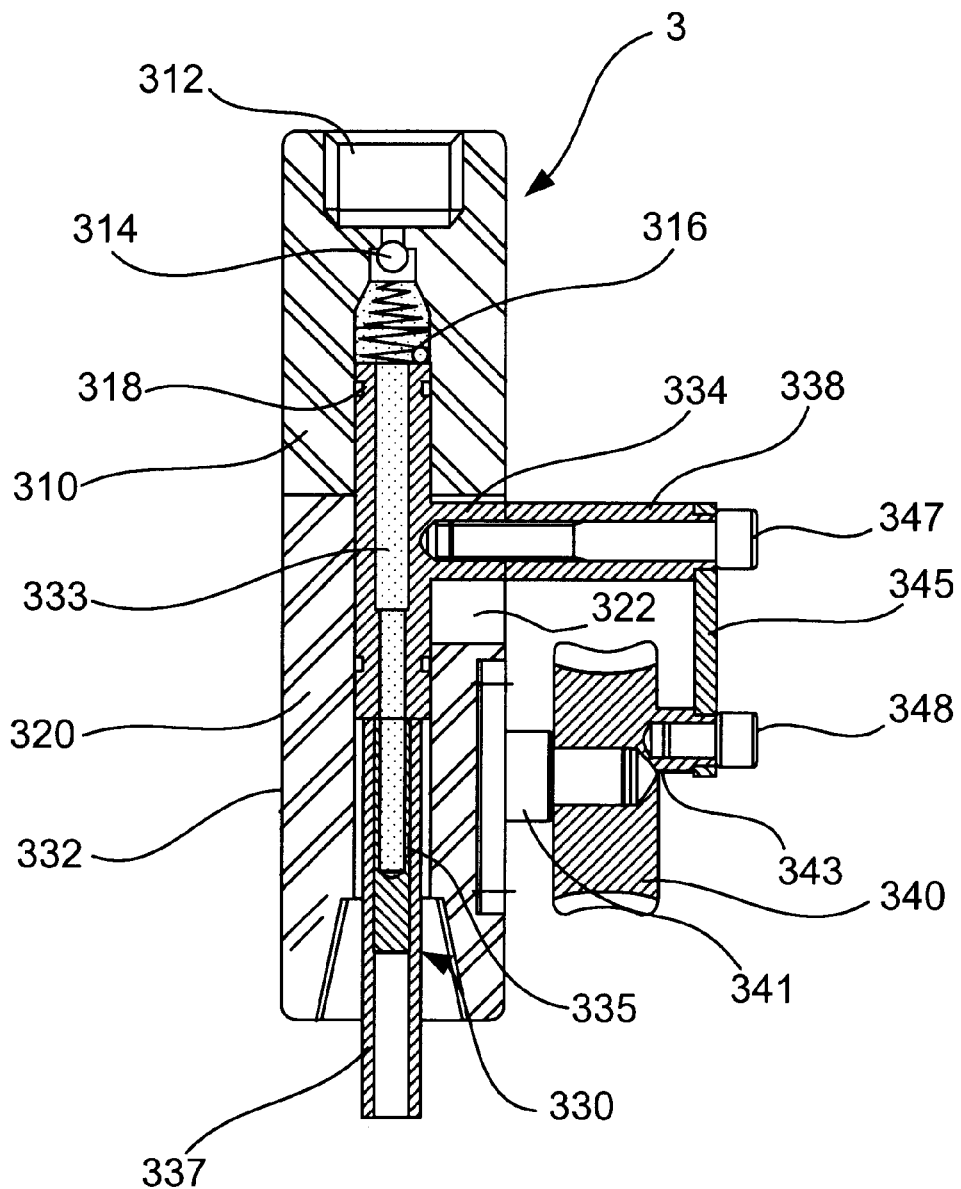
FIG. 10 is a sectional view of a lubricating oil pump explaining the state of the lubricating oil extrusion.

The sucked lubricating oil is compressed and moves downward along the through hole 333 as the eccentric driving shaft 343 moves to its uppermost position by the continuous rotation of the work wheel 340, and thus the plunger shaft 332 ascends (FIG. 10).

The compressed lubricating oil is discharged inside the tube 337 through the exhaust hole 335 to be fed to the shaft of the bearing.

In the above-described lubricating oil discharge process, the ball valve 314 prevents the reverse flow of the lubricating oil, and the tube 337 intercepts a reverse inflow of the discharged lubrication oil.

If the worm wheel 340 is rotated by one revolution by the motor, the lubrication oil is once discharged.

The completion of one cycle of the lubricating oil discharge is effected in a manner that a sensor (not illustrated) detects one revolution of the worm wheel, and the control means stops the motor according to a detected signal.

The pump 3 which sucks and discharges the lubricating oil as described above transfers a specified volume of the lubricating oil, and thus the insufficient feeding or overfeeding of the lubricating oil can be thoroughly eliminated.

Meanwhile, if the suction of the lubricating oil is performed, the lubricating oil pouch 220 loses the specified volume of the lubricating oil contained therein, and at this time, the pouch 220 is contracted by the pressure of the pressure spring 210 and the pressure plate 212. Even when the residual quantity of the lubricating oil is decreased by long-term use of the apparatus, the lubricating oil pouch 220 shrinks with its horizontality maintained, thereby not obstructing the suction operation of the lubricating oil.

If the residual quantity of the lubricating oil vanishes completely or the battery is dissipated due to the continuous use of the apparatus, such information is displayed on the LCD, so that the user can replace the dissipated elements accordingly.

The replacement of the lubricating oil is achieved by loosing the top cover 2, separating the gateway 222 therefrom, and then inserting a new lubricating oil pouch 220. The replacement of the battery is achieved by separating and extracting the battery case 112 by loosing the clip secured to the partition 114, exchanging the dissipated battery for a new one, and fastening them in a reverse order.

Meanwhile, it is preferable that the nipple is made of steel since it is required to be firmly formed considering the vibration-proof characteristic.

As described above, according to the present invention, the oil-separation phenomenon can be removed even if the apparatus is used for a long time by effecting a pumping operation for the suction and discharge of lubricating oil by the pressure of a plunger ascending and descending by a mechanical driving force, and thus by not applying a high pressure to a lubricating oil pouch.

Further, an accurate amount of lubricating oil can be fed by extruding a fixed quantity of lubricating oil by the stroke of a plunger, and thus a harmful influence upon the machine elements due to the insufficient feeding or overfeeding of the lubricating oil can be prevented as well as the resistance of tube passages can be overcome by a high discharge pressure by a plunger to facilitate the lubricating oil feeding to the machine elements.

Furthermore, the replacement work of the lubricating oil or the battery can be facilitated by exchanging only the lubricating oil pouch or the battery, and this also results in the reduction of the environmental pollution.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic lubricant dispenser apparatus to dispense a predetermined amount of lubricant at predetermined intervals, the apparatus comprising:

a lubricant reservoir having a dispensing gateway to dispense the lubricant therefrom; and a pump assembly having:

a pump housing defining an elongated passage extending therethrough from an intake port, in fluid communication with the dispensing gateway of the lubricant reservoir, to a dispensing port formed, to dispense the lubricant from the dispenser apparatus;

an elongated plunger assay having a plunger body disposed in said elongated passage for reciprocating movement between a load position, aspirating a predetermined volume of lubricant through said intake port and into a pump chamber portion of the elongated passage, and a dispensing position, dispensing the predetermined volume of the lubricant from the chamber portion through the dispensing port, said plunger body having a through-hole extending in a direction axially therethrough, said through hole having a proximal opening in fluid communication with the chamber portion of the elongated passage and a distal opening in fluid communication with the dispensing port of the elongated passage;

a seal device cooperating between the plunger body and the interior wall of the pump housing defining the elongated passage to hermetically separate the chamber portion from the dispensing port;

an intake check valve disposed proximate to the intake port of the pump housing, and movable between an open position and a closed position; and a dispensing check valve disposed proximate to the dispensing port of the pump housing, and movable between an open position and a closed position;

wherein when the elongated plunger assay is moved toward the load position, said intake check valve is moved to the open position to enable lubricant to flow from the reservoir into the chamber portion of the elongated passage through the intake port, and said dispensing check valve is moved to the closed position to prevent the flow of lubricant from the chamber portion of the elongated passage and out through the distal opening to the dispensing port of the elongated passage, and wherein, when the elongated plunger assay is moved toward the dispensing position, said intake check valve is moved to the closed position to prevent the flow of lubricant in the chamber portion out through the intake port, and said dispensing check valve is moved to the open position to enable the predetermined volume of lubricant to flow from the chamber portion of the elongated passage out through the dispensing port of the elongated passage.

2. The dispenser apparatus according to claim 1, wherein said pump assembly includes a drive assembly coupled to said pump assay to reciprocally drive said pump body between the load position and the dispensing position.

3. The dispenser apparatus according to claim 2, wherein said pump housing includes an elongated slot extending generally perpendicularly into said elongated passage, said drive assembly includes a lever member extending outwardly from said plunger body and through said elongated slot of the pump housing, said lever member being coupled to a motor moving said lever member reciprocally in the elongated slot to drive the plunger assay between the load position and the dispensing position.

4. The dispenser apparatus according to claim 3, wherein said drive assembly includes a wheel rotatably coupled to the motor, and having an eccentric driving shaft, said drive assembly further including a link having one end rotatably coupled to the lever member and an opposite end rotatably coupled to the drive shaft for converting the rotational motion of the wheel into the generally linear reciprocating motion of the pump assay in the elongated passage between the load position and the dispensing position.

5. The dispenser apparatus according to claim 3, wherein said lubricant reservoir includes a collapsible pouch adapted to collapse as the lubricant is dispensed from therein.

6. The dispenser apparatus according to claim 5, further including:
a pressure plate biased against said collapsible pouch to urge flow of said lubricant through said gateway when the intake check valve is in the opened position.

7. The dispenser apparatus according to claim 6, further including:
a cover member formed for receipt of said pressure plate and said collapsible pouch therein; and
a pressure spring disposed between said cover member and said pressure plate to bias said pressure plate toward said collapsible pouch.

8. The dispenser apparatus according to claim 1, wherein said intake check valve includes a ball member disposed in said pump chamber portion of the elongated passage, and having a transverse cross sectional area larger than that of the intake port, and a compression spring disposed between said ball member and a proximal end of said pump body, wherein in said dispensing position, said compression spring urges said ball member against said intake port in the closed position thereof.

9. The dispenser apparatus according to claim 1, wherein said dispensing check valve includes
a finger portion extending distally from said plunger body of the pump assay, and said through-hole extending at least partially but not all the way through said finger portion, said finger portion defining an exhaust hole extending radially inward from an outer surface of said finger portion to said through hole for fluid communication between the dispensing port and the pump chamber portion of the elongated slot, and
a flexible tube member extending over at least a portion of said outer surface to cover the exhaust hole of the finger portion in a manner such that: a negative pressure in the pump chamber portion during movement of the pump assay toward the load position causes said flexible tube to seal said exhaust hole in the closed position; and a positive pressure in the pump chamber portion during movement of the pump assay toward the dispensing position causes said flexible tube to unseal said exhaust hole in the opened position to permit the predetermined lubricant to flow out of said dispensing port.

10. The dispenser apparatus according to claim 1, further including:
a seal device cooperating between the plunger body and the interior wall of the pump housing defining the elongated passage to hermetically separate the chamber portion from the dispensing port.

11. An automatic lubricating oil feeding apparatus for feeding a predetermined amount of lubricating oil to a bearing at predetermined intervals, the apparatus including:

a housing;
an oil pouch received in said housing, and having a gateway to dispense oil therefrom;
a motor;
a pump assembly having an upper body portion and a lower body portion, and defining an elongated passage extending axially through the upper body portion and the lower body portion, said elongated passage having a tap hole in the upper body portion in fluid communication with the gateway of said oil pouch and a dispensing hole in the lower body portion, said pump assembly further including a plunger assay having a hollow plunger body slidingly disposed in said elongated passage for reciprocating movement by said motor away from said oil pouch in a load position, drawing oil through said tap hole and into a pump chamber portion formed between the elongated passage and the plunger body, and toward said oil pouch in a dispensing position, expelling oil from said pump chamber portion and through said dispensing hole, said plunger body defining a through-hole extending axially and having a proximal port in fluid communication with said pump chamber portion and an opposite exhaust hole in fluid communication with said dispensing hole; and
an intake check valve having a ball disposed in said pump chamber portion, and a compression spring disposed between the ball and the proximal end of the pump body, said ball having a transverse cross-sectional dimension greater than that of the tap hole, said ball being caused to seal said tap hole by said compression spring when said plunger body is driven toward the dispensing position, and being caused to unseal from said tap hole when said plunger body is driven toward the loading position; and
a dispensing check valve having flexible tube resiliently extending over an exterior portion of the plunger body and over said exhaust hole, said flexible tube being caused to seal said exhaust hole when negative pressure is created in said pump chamber portion when said plunger body is driven toward the load position, and being caused to unseal from said exhaust hole when a positive pressure is created in said pump chamber portion when said plunger body is driven toward the dispensing position.

12. The oil feeding apparatus according to claim 11, wherein
said lower body portion defines an elongated slot extending generally perpendicularly into said elongated passage, and
said plunger body includes a lever member extending outwardly therefrom through said elongated slot of the pump housing, said lever member being movably coupled to said motor to reciprocally drive said lever member in the elongated slot to drive the plunger assay between the load position and the dispensing position.

13. The oil feeding apparatus according to claim 11, further comprising:
a linkage assembly including:
a wheel rotatably mounted to the lower body portion of the pump assembly and coupled to the motor for rotation about a rotational axis thereof, said worm wheel including an eccentric driving shaft off-set from said rotational axis;

a link having one end rotatably coupled to the lever member and an opposite end rotatably coupled to the drive shaft for converting the rotational motion of the wheel into the generally linear reciprocating motion of the pump assay in the elongated passage between the load position and the dispensing position.

14. The oil feeding apparatus according to claim 13, wherein said wheel is a worm wheel which is drivably mated to a worm gear driven by said motor.

15. The oil feeding apparatus according to claim 11, wherein said oil pouch includes a plurality of bellows, and is adapted to collapse as the oil is dispensed therefrom.

16. The oil feeding apparatus according to claim 15, further including:

a pressure plate biased against said collapsible pouch to urge flow of said oil through said gateway when the intake check valve is in the opened position.

17. The oil feeding apparatus according to claim 16, further including:

a pressure spring disposed between said housing and said pressure plate to bias said pressure plate toward said oil pouch.

18. The oil feeding apparatus according to claim 11, wherein said motor include a speed reducer.

19. The oil feeding apparatus according to claim 11, wherein said housing includes a lower main case, and a top cover cooperating to enclose said pump assembly and said oil pouch, and a partition separating the oil pouch from said pump assembly.

20. The oil feeding apparatus according to claim 19, further including:

a battery assembly configured to supply power to the motor, and adapted to detachably mount to said partition.

21. The oil feeding apparatus according to claim 11, further including:

a liquid crystal display for displaying state of operation information is formed on one side of said housing.

22. The oil feeding apparatus according to claim 11, further including:

seal device cooperating between the plunger body and the interior wall of the pump housing defining the elongated passage to hermetically separate the chamber portion from the dispensing port.

* * * * *